May 1, 1945.  J. KURTZ  2,374,942
DIE MOUNT AND METHOD OF MAKING THE SAME
Filed Jan. 13, 1944
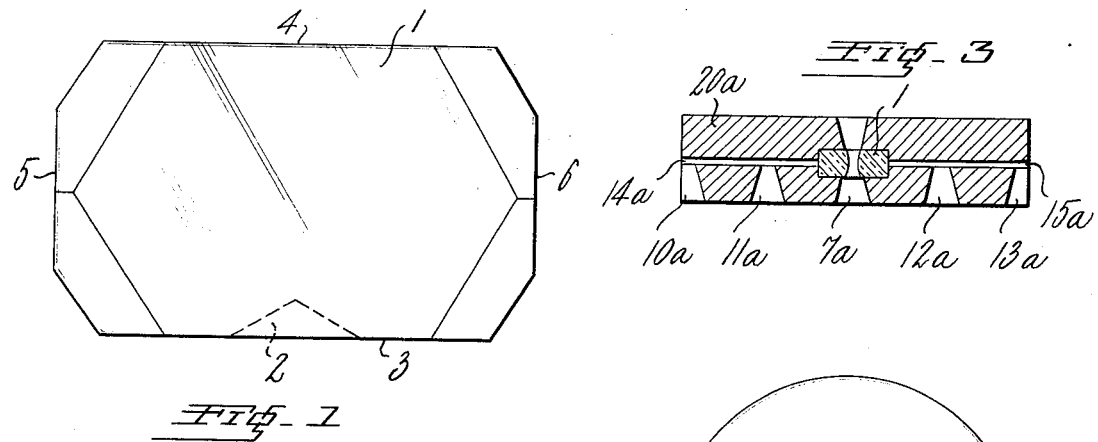
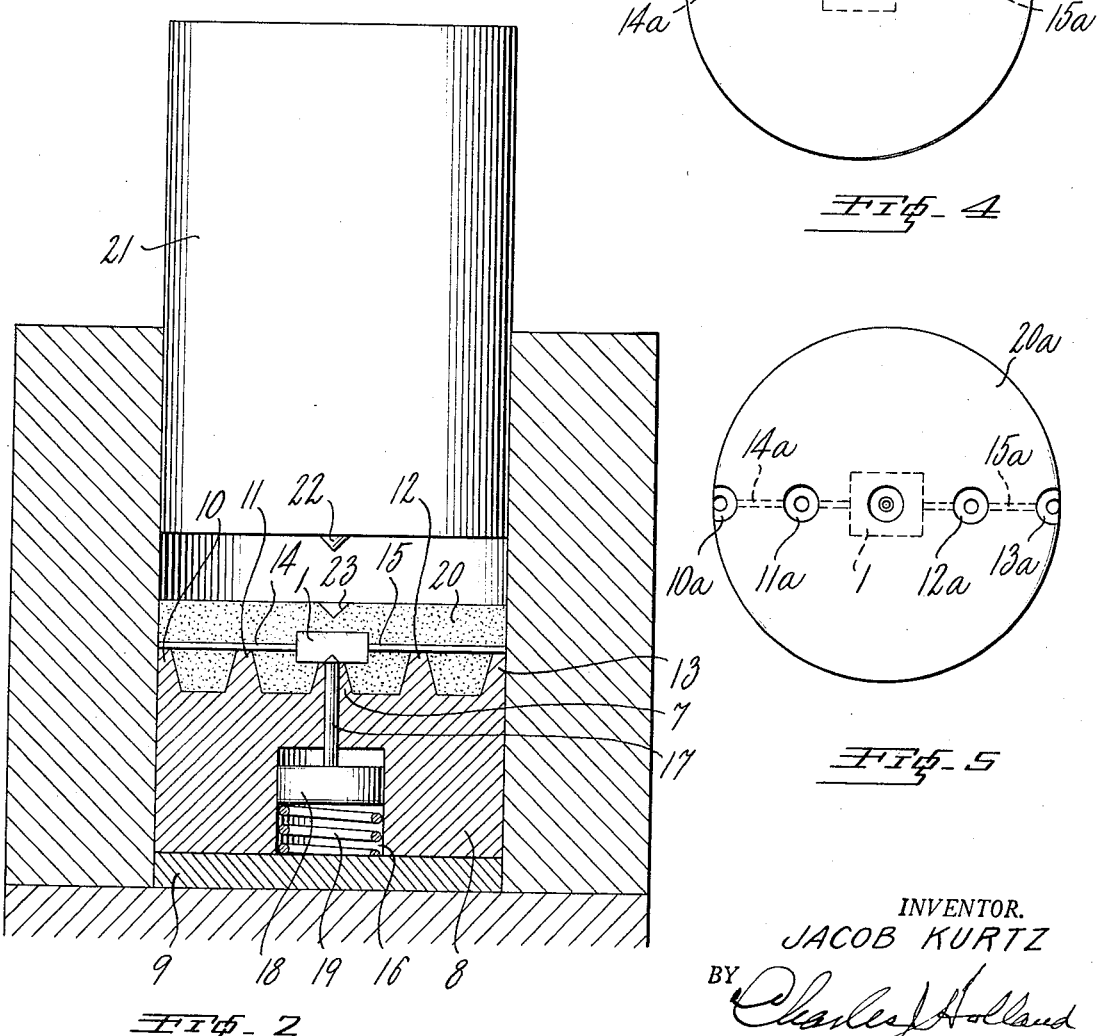
INVENTOR.
JACOB KURTZ
BY
*Charles J. Holland*
ATTORNEY Patented May 1, 1945

2,374,942

UNITED STATES PATENT OFFICE 2,374,942

DIE MOUNT AND METHOD OF MAKING THE SAME

Jacob Kurtz, Teaneck, N. J., assignor to Callite Tungsten Corporation, Union City, N. J., a corporation of Delaware Application January 13, 1944, Serial No. 518,099

9 Claims. (Cl. 76—107)

The present invention relates to die mounts and a method of mounting dies. The method of mounting is applicable generally to dies of all types including hard metal carbide dies, but it has special advantages for mounting diamond dies.

The method of mounting dies at present in use consists, generally, in preparing a cold rolled steel or brass blank, circular in form and approximately 1" in diameter by ⅜" thick, having a concentric recess about ⅜" in diameter and ¼" deep to receive the die nib. The die nib, for example, a completely drilled diamond, is carefully centered on the bottom of this recess and a needle pointed carbon or refractory rod is inserted into the entrance cone of the diamond. The needle pointed rod is weighted in order to hold the diamond in position on the bottom of the recess of the blank. Molten brazing metal such as brass or welding bronze is then poured into the recess around the diamond in amount sufficient to fill the recess. After the brazing metal has hardened, it is machined to smooth off the face of the die blank. The result is a die blank having a fully drilled diamond completely buried under the brazing metal in the recess of the blank. The die is then finished by drilling an opening through the metal of the mount from one side communicating with the hole drilled through the diamond and then by drilling an opening through the metal of the blank from the other side also communicating with the hole through the diamond. The opening thus made passes entirely through the die, the hole through the diamond forming part of this opening.

In drilling diamonds for dies, the hole through the diamond is generally begun by drilling a conical cavity more than half way through the diamond from one side and then completing it by drilling another cavity from the other side until a break through occurs. The axes of the two cavities must coincide exactly and the axial symmetry must be carried out through the mount drilling as well as in the diamond itself. A high degree of accuracy in this respect is necessary and even a very slight deviation from axial symmetry will greatly impair the usefulness and efficiency of the die.

In the method of mounting dies hereinabove described, it is exceedingly difficult to preserve axial symmetry of the opening through the die even when the die nib itself is perfectly drilled.

In the first place it is very difficult to prevent shifting of the die nib after it is placed on the bottom of the recess in the blank. Again, one can never be sure that the bottom surface of the recess is perfectly level or that the nib is truly flat upon the bottom surface of the recess even if that surface is perfectly level. As a consequence, the bearing in the die is seldom truly concentric with the perimeter of the die mount or truly at right angles to the planes of the die mount surfaces. It is essential to attain these conditions if maximum life and minimum wear of the die is to be obtained and if the die is to be capable of drawing a truly round and straight wire.

The life and efficiency of a die, furthermore, depends in part upon the characteristics of the metal of which the mount is composed. For example, the metal forming the die must be resistant to oxidation and must be capable of withstanding the action of strong alkalies. It frequently happens with metal mounts at present in use that drawing temperatures are sufficiently high to cause the mount to oxidize to such a degree that the die nib loosens. If, further, in drawing a wire of tungsten or molybdenum, the wire breaks in the die, as often happens, it must be dissolved out by using a fused alkali nitrate which also has a strong oxidizing effect on the usual mount metals. While the method of the invention may be applied to mounts composed of metals commonly in use, I prefer to use a special alloy having high resistance to oxidation under the conditions mentioned.

The special alloy is of particular value where the conditions of drawing involve high temperatures and its composition and the method of preparing it is more fully disclosed and claimed in an application for patent about to be filed by me contemporaneously with this application.

A very satisfactory alloy of the type disclosed and claimed in my said application consists of nickel, copper, chromium and silver, and may be prepared in the following manner, powder metallurgy methods being used. The chromium may be replaced by the same amount of zirconium, beryllium or aluminum without substantial change in the characteristics of the final alloy.

In forming this alloy, a master alloy of nickel and chromium is prepared, the proportions being about 90% nickel powder and 10% chromium powder. These metals are of 200 mesh or finer. The powders are thoroughly mixed and heat treated until thorough diffusion and alloying takes place. The resulting alloy, which has become sintered, is then crushed or otherwise reduced to a fine powder. I call this powdered alloy metal A.

I then form a mixture of nickel and copper powders in the proportions of 70% nickel and 30% copper. These powders are thoroughly mixed and are here referred to as metal B.

Metal A and metal B are then mixed in the following proportions:

| | Per cent |
|---|---|
| Metal A | 1-20 |
| Metal B | 99-80 |

I refer to this metal as metal C.

Assuming that metal C contains 10% of metal A and 90% of metal B, all thoroughly mixed, I now add 90% of metal C to 10% of silver powder and obtain the final metal from which the die mount is formed by sintering until thorough diffusion and alloying takes place. The constituents of this final metal will be seen to be, on the basis of the proportions above given, about as follows:

| | Per cent |
|---|---|
| Nickel | 64.8 |
| Copper | 24.3 |
| Chromium | .9 |
| Silver | 10.0 |
| | 100.0 |

The proportions given are by weight. The chromium must be separately alloyed with nickel in the manner above stated in order to prevent it from oxidizing and forming nodes that distribute throughout the mass in a porphyritic structure.

However, where the die is intended for cold drawing, I may use for the mount metal a bronze powder having a composition of about 80% copper and 20% tin, and the resulting alloy having a melting point of about 900° C.; or a brass powder consisting of copper 60% and zinc 40%, having a melting point of about 950° C. Or I may prefer to use copper and tin powders, or copper and zinc powders, mixed in the above stated proportions and cause the respective alloys to form by diffusion during the heat treatment that follows. In any case, methods of powder metallurgy are used in forming the mount.

It is an object of the present invention to provide a method of mounting a die nib in a die mount in a manner that will assure utmost accuracy of drilling and coaxial symmetry of the die bearing.

It is a further object to provide a die mount in which light channels are provided through which the progress of the drilling of the die nib can be observed.

It is a further object to provide a die mount that is highly resistant to oxidation and the action of a strong alkaline solutions.

The method of the present invention is based on principles of powder metallurgy and avoids the disadvantages of prior methods hereinabove enumerated. It assures at all times perfect alignment and concentricity of the die in the mount and provides channels to the viewing "windows" of the diamond, thus permitting passage of light to the diamond whereby the progress of the drilling and polishing can be observed as the work proceeds. It is to be noted that the die nib is not completely drilled before being set into the mount. A small cavity in one face only is made which is availed of to engage a needle which forms part of the mold and which holds the nib in place and prevents the nib from shifting in the mold.

The invention will be more clearly understood from the drawing in which

Fig. I represents in greatly enlarged form a diamond prepared for mounting having a cavity drilled in the under face;

Fig. II shows in sectional elevation, a mold suitable for use in forming the die mount;

Fig. III represents in section a completed die of the invention;

Fig. IV is a plan view of a completed die viewed from above; and

Fig. V is a plan view of the same die viewed from below.

Referring now to the drawing, the diamond 1 which is to form the nib of the die is shown with a small conical cavity 2 prepared in its lower face 3. Lower and upper faces 3 and 4 respectively have been ground in exact parallel relationship to each other. These are the drilling faces through which the perforation will later be drilled from one to the other. Likewise the faces 5 and 6 are ground in exact parallel relationship to each other and in exactly right angular relation to faces 3 and 4. These are known as the "window" faces and serve to permit observation of the progress of drilling through the diamond.

The diamond thus prepared is placed in a mold shown in Fig. II. In this figure the diamond 1 is shown seated on a flat topped pillar or support 7 with the cavity 2 on its under face. This support 7 is carried by the lower stationary plunger 8 which rests upon removable base element 9. In addition to support 7, plunger 8 carries on its upper surface the pillars or supports 10, 11, 12 and 13. These latter supports have grooved tops and are adapted to carry the two rods 14 and 15 so that their inner ends contact the window faces of the diamond on opposite sides and their outer ends contact the sides of the mold. The support 7 has a perforation in its flat top and the cavity 2 of the diamond 1 is placed in exact register with the opening of this perforation. In the bottom of the lower plunger 8, a recess 16 is formed and within this recess is placed a needle 17 mounted on a base 18 which is forced upwards by spring 19 so that the needle 17 projects through the opening in support 7 and fits into the cavity 2 of the diamond 1, thus holding it in place and preventing it from shifting.

Assuming now that the die is intended for use where high temperatures are involved, a measured amount of metal powder 20, the constituents of which after alloying and sintering are highly resistant to oxidation and to strong alkaline solutions, is then poured into the mold completely covering the diamond and filling the spaces between and around the pillars or supports 7, 10, 11, 12 and 13. These powdered metals preferably consist of nickel, chromium, copper and silver in the proportions hereinabove described and prepared as disclosed above.

The moving plunger 21 having a conical nipple 22 is then placed in the mold and forced down upon the powdered metal 20 under a pressure of from five to twenty tons per square inch, thus compacting the powdered metal and forming a conical depression 23 in the top surface of the compacted powder. This depression 23 is coaxial with the conical cavity 2 of the diamond 1 and serves as a starting point for drilling through the die mount and die nib.

The pressed compact is then easily removed from the mold and heat treated in a furnace in a dry hydrogen atmosphere at a temperature of 300°–400° C. for a period of about one-half hour. This is a presintering step. The rods 14 and 15 perform the function of keeping open channels through the die mount from the circumference to the window faces of the diamond nib. They may be made of an organic plastic material, in which case they will vaporize under the heat treatment and pass out, leaving the channel free. Or, they may be made of thin walled nickel tubing, in which case a graphite rod may be inserted to keep the tube from collapsing under the pressure used in compacting the powdered metal. The graphite rods can be either drilled out or burned out, leaving the tubes in place in the channels.

A further and final heat treatment at a temperature of about 800°–900° C. for about a half hour, also in a dry hydrogen atmosphere, finally sinters the metal and causes thorough diffusion of the constituents to form the desired alloy.

In cases where the die is intended for cold drawing, the mount metal may be formed of a bronze powder consisting of 80% copper and 20% tin, or a brass powder consisting of 60% copper and 40% zinc. The constituent metals are thoroughly mixed and poured into the mold in the same manner as in the case of the special alloy hereinabove mentioned. The pressing, presintering and final sintering proceed similarly also, the presintering temperature being from about 300° C. to 400° C. and the final sintering at a temperature just below the melting point of the bronze or brass.

The finished die is represented in section by Fig. III of the drawing in which the bearing through the die is indicated at 7ª. This bearing has been partly formed by the support 7 on which the diamond nib rested during formation of the mount, and partly results from the drilling through the upper part of the die mount and through the diamond. Small openings also appear on the underside of the die where the rod supports were placed. These openings are numbered 10ª, 11ª, 12ª and 13ª. The openings left after the removal of the rods 14 and 15 are indicated at 14ª and 15ª. In Figs. IV and V, the former being a plan view from above and the latter a plan view from below, these same openings are indicated. In Figs. IV and V, 1 indicates the diamond nib, 20ª the mount, and 14ª and 15ª the openings passing through the mount from the sides to the windows of the die nib.

If the die nib is of material other than a diamond as, for instance, tungsten carbide, it is, of course unnecessary to have the passages 14ª and 15ª running through the mount to the die nib, and similarly it will be unnecessary in preparing the mold to provide the supports 10, 11, 12 and 13 on which the rods 14 and 15 are supported during the molding of the powdered metal. In other respects, however, the method of making the die is the same.

Having thus described my invention, what I claim is:

1. Method of making a diamond die comprising grinding a diamond nib so as to provide windows in opposite sides thereof positioning a diamond nib centrally in a mold upon a support having means associated therewith to prevent said nib from shifting its position; supporting rods in said mold radially in contact with the windows of said nib and with the sides of said mold; then pouring metal powders consisting of 64.8% nickel, 24.3% copper, 0.9% chromium and 10.0% silver by weight into said mold and over and around said nib and said rods; compacting said metal powders under hydraulic pressure; removing said compacted mass from said mold and sintering said compact and alloying said powders; then removing said rods and drilling a bearing through said mount and through said nib under observation through the openings resulting from the removal of said rods.

2. A diamond die comprising a mount of difficultly oxidizable alloy consisting of about 64.8% nickel, 24.3% copper, 0.9% chromium and 10% silver; a diamond die nib having window faces ground on opposite sides thereof centrally positioned therein; and openings through opposite sides of said mount to the windows of said nib permitting observation of the bearing drilled through the nib.

3. A diamond die comprising a metallic mount, a diamond nib having window faces ground on opposite sides thereof centrally positioned in said mount and openings through opposite sides of said mount to the windows of said nib, permitting observation of the bearing through said nib.

4. Method of making a diamond die comprising grinding a diamond nib so as to provide windows on opposite sides thereof, positioning said nib centrally in a mold upon a support having means associated therewith to prevent said nib from shifting its position, supporting rods in said mold radially in contact with the windows of said nib and with the sides of said mold; then pouring metal powder into said mold and over and around said nib and said rods and compacting said metal powder; then removing said compacted powder from said mold and sintering the same to a dense metallic state in an atmosphere of dry hydrogen; then removing said rods and drilling a bearing through said mount and said nib under observation through the openings resulting from the removal of said rods.

5. Method of making a die that comprises preparing a diamond nib with windows on opposite sides of said nib, placing said diamond nib on a central supporting pillar in a mold and placing rods on either side of said diamond nib supported on pillars in alignment with said central pillar with one end of each rod bearing on a window of said nib and the other end of said rod bearing against the wall of said mold; then pouring powdered metal into said mold around and over said pillars and said rods until said mold is filled, compacting said powdered metal about said nib, removing said metal so compacted and said nib from said mold and sintering said metal in a furnace in an atmosphere of dry hydrogen until the metal powders form a dense strong mount about said nib; then removing said rods from said mount so formed and drilling said diamond nib under observation through the passages resulting from the removal of said rods whereby the symmetry of said drilling can be determined and controlled.

6. Method of making a die that comprises preparing a diamond nib with windows on opposed sides thereof, placing said diamond nib in a mold on a support centrally disposed in said mold, supporting rods on opposite sides of said nib so that one end of each said rod bears against a window of said nib and the other ends bear against the side of said mold; then pouring powdered metal into said mold about and over said nib and said rods, compacting said powdered metal in said mold by hydraulic pressure, removing said compacted metal with said nib centered therein from said mold and sintering said powdered metal, thereby forming a dense metallic mount for said nib; then removing said rods leaving passages from the circumference of said mount to the windows of said nib, and then drilling a die bearing through said mount and said nib under observation through said passages.

7. Method of making a die that comprises grinding a diamond to form exactly parallel upper and lower drilling faces and also exactly parallel window faces in exactly right angular relation to said drilling faces; drilling a small cavity in said lower drilling face; then supporting said diamond nib centrally in a mold with the drilled lower drilling face resting on said support and supporting a rod at either side of said nib, each rod contacting a window of said nib at its inner end and the wall of said mold at its outer end; then compacting powdered metal in said mold completely covering said diamond and said rods; then removing said compacted metal with said nib and said rods contained therein and presintering the same in a dry hydrogen atmosphere at a temperature of 300° to 400° C.; removing the rods, thus leaving passages from the circumference of said die mount to each window face of said nib; then completely sintering said mount at a temperature of 800° to 900° C. also in a dry hydrogen atmosphere; and finally drilling a bearing through said nib and said mount while observing said drilling through said passages and said windows.

8. Method of making a die that comprises grinding a diamond nib to form exactly parallel window faces on opposite sides of said diamond nib; then supporting said diamond nib centrally in a mold and supporting a rod at either side of said nib, each rod contacting a window of said nib at its inner end and the wall of said mold at its outer end; then compacting powdered metal in said mold completely covering said diamond and said rods; then removing said compacted assembly and sintering the same in a dry hydrogen atmosphere and removing the rods, thus leaving a passage from the circumference of said die mount to each window face of said nib; and finally drilling a bearing through said nib and said mount while observing the course thereof through said passages and said windows and directing the drilling symmetrically.

9. Method of drilling a diamond die that consists in grinding a diamond nib so as to provide windows on opposite sides thereof, mounting said nib in a metallic mount having open passages from the circumference of said mount to the windows of said nib and drilling a bearing through said mount and said nib while directing said drilling under observation through said passages.

JACOB KURTZ.